(12) United States Patent
Katerberg

(10) Patent No.: US 12,213,414 B2
(45) Date of Patent: Feb. 4, 2025

(54) AUTONOMOUS LANDSCAPE IRRIGATION APPARATUS

(71) Applicant: Aaron P. Katerberg, Grand Rapids, MI (US)

(72) Inventor: Aaron P. Katerberg, Grand Rapids, MI (US)

(*) Notice: Subject to any disclaimer, the term of this patent is extended or adjusted under 35 U.S.C. 154(b) by 0 days.

(21) Appl. No.: 17/714,263

(22) Filed: Apr. 6, 2022

(65) Prior Publication Data

US 2023/0165200 A1 Jun. 1, 2023

Related U.S. Application Data

(60) Provisional application No. 63/172,910, filed on Apr. 9, 2021.

(51) Int. Cl.
*A01G 25/09* (2006.01)
*A01G 25/16* (2006.01)
*G05D 1/00* (2006.01)

(52) U.S. Cl.
CPC ............ *A01G 25/09* (2013.01); *A01G 25/16* (2013.01); *G05D 1/0088* (2013.01); *G05D 1/0225* (2013.01)

(58) Field of Classification Search
CPC ................................ A01G 25/16; A01G 25/09
See application file for complete search history.

(56) References Cited

U.S. PATENT DOCUMENTS

| | | | | |
|---|---|---|---|---|
| 2013/0266380 | A1* | 10/2013 | Capron | C12M 23/14 405/184.4 |
| 2020/0267916 | A1* | 8/2020 | Sol | A01G 27/001 |
| 2020/0359582 | A1* | 11/2020 | Tran | A01G 22/00 |
| 2021/0094853 | A1* | 4/2021 | Yan | B09C 1/105 |
| 2023/0389490 | A1* | 12/2023 | Schenk | A01D 43/14 |

* cited by examiner

*Primary Examiner* — Andrea C Leggett
(74) *Attorney, Agent, or Firm* — Price Heneveld LLP

(57) ABSTRACT

An autonomous irrigation apparatus that employs various data from the ambient environment to inform water dispensing functionality to optimize water use has an above-ground, mobile, self-propelled, autonomous water delivery platform (e.g., a water delivery robot) that is connected to a water source from which it is able to draw a continuous supply of water for irrigating residential or commercial landscapes, lawns and/or gardens. The irrigation apparatus has a drive sub-system, an onboard hose and reel system, a water dispenser system, a sensor system, a control system, a user interface system and a power and charging system.

20 Claims, 14 Drawing Sheets

AUTONOMOUS LANDSCAPE IRRIGATION APPARATUS

CROSS-REFERENCE TO RELATED APPLICATION

This application claims the benefit of U.S. Provisional Application No. 63/172,910 filed on Apr. 9, 2021. The entire disclosure of the above application is incorporated herein by reference.

FIELD

The present disclosure relates to landscape irrigation systems such as for use at residential and commercial properties. More particularly, the present disclosure relates to an above-ground, self-propelled, autonomous irrigation apparatus for watering a lawn and/or garden.

BACKGROUND

This section provides background information related to the present disclosure which is not necessarily prior art.

Automatic underground sprinkler systems are commonplace for watering the lawns of residential and commercial properties. Such underground sprinkler systems typically employ a timer/controller, valve systems, a network of pipes or tubes laid in the soil beneath the lawn and a plurality of "pop-up" sprinkler heads that disperse water to "zones" of the lawn or garden in an airborne stream, spray or mist.

Installation of underground sprinkler systems can be labor intensive and can require specialized equipment.

Further, underground sprinkler systems require regular maintenance to operate as designed. Regularly maintaining and servicing automatic underground sprinkler systems, however, including identifying and trouble-shooting breakdowns and making necessary repairs, can be difficult to perform and time consuming, particularly since the system and its components are not readily accessible. Additionally, watering a lawn or garden with a traditional underground sprinkler system can result in water delivery inefficiencies, particularly if the sprinklers are out of adjustment or a needed repair to the system goes undetected. Still further, ambient weather conditions can negatively impact the water-delivering efficiency of such sprinkler systems, such as, for example, the wind redirecting the stream of water from a sprinkler head away from its intended delivery zone.

Consequently, there remains a need to improve the ease and ability to deploy, maintain and service landscape irrigation systems and equipment and to improve the water-delivery efficiencies of such systems.

SUMMARY

This section provides a general summary of the disclosure, and is not a comprehensive disclosure of its full scope or all of its features.

The apparatus of the present disclosure provides a landscape irrigation system, particularly for use in irrigating residential and/or commercial landscapes and lawns that uses various environmental data to inform watering decisions to optimize water use as it is dispensed by an above-ground, mobile, self-propelled, autonomous water delivery platform.

The water delivery platform can be equipped with an onboard hose, reel system, controllers, sensors, and various nozzles. The hose is attached to a water source where it is able to draw a continuous supply of water. The water delivery platform incorporates rechargeable battery that can be recharged when it is docked at a designated location.

A variety of sensors can be incorporated into the apparatus for collecting data (e.g., from the ambient environment) relating to variables such as grade, sun, shade, soil moisture content and evapotransporation. The data can then be used by the apparatus in determining optimal water delivery performance (e.g., precipitation rate and coverage of a lawn or plant bed) to be executed by the water delivery platform, such as by controlling and varying water spray patterns and volumetric flow rates as needed along its delivery path. As such, the apparatus can efficiently deliver water to the landscape and help save water.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
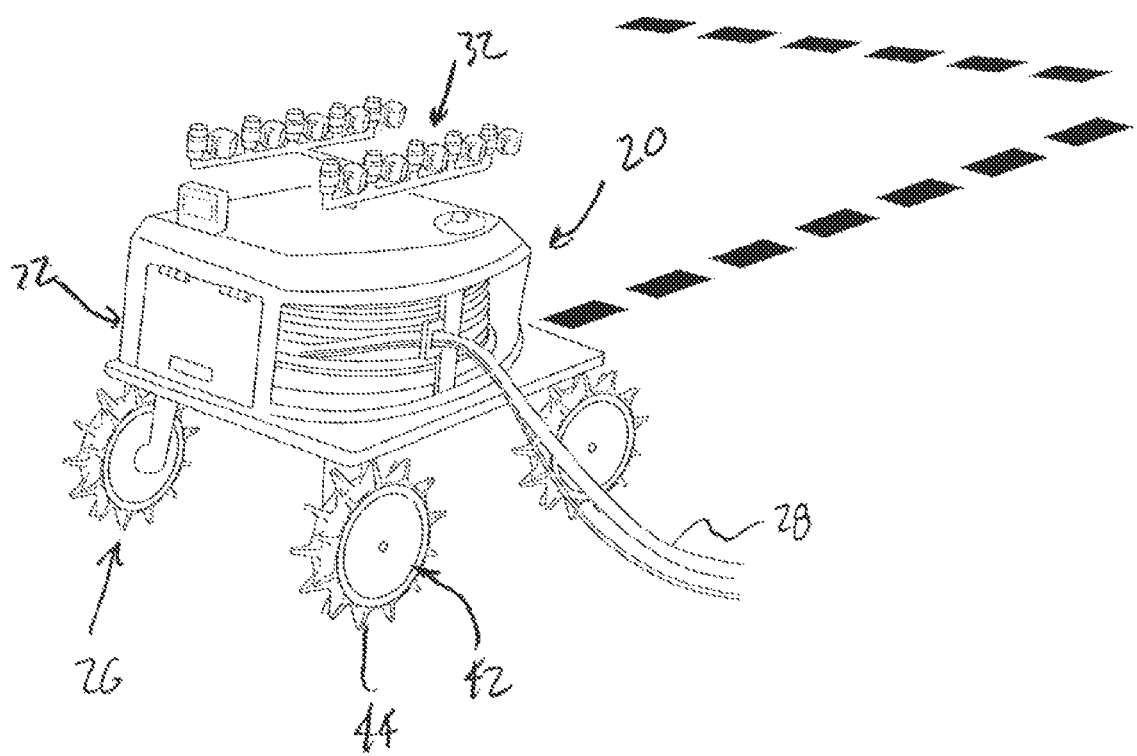
FIG. 1 shows a perspective view of an exemplary water delivery platform of the autonomous irrigation apparatus of the present disclosure and a water delivery path for the autonomous irrigation apparatus of the present disclosure.
Figure 2:
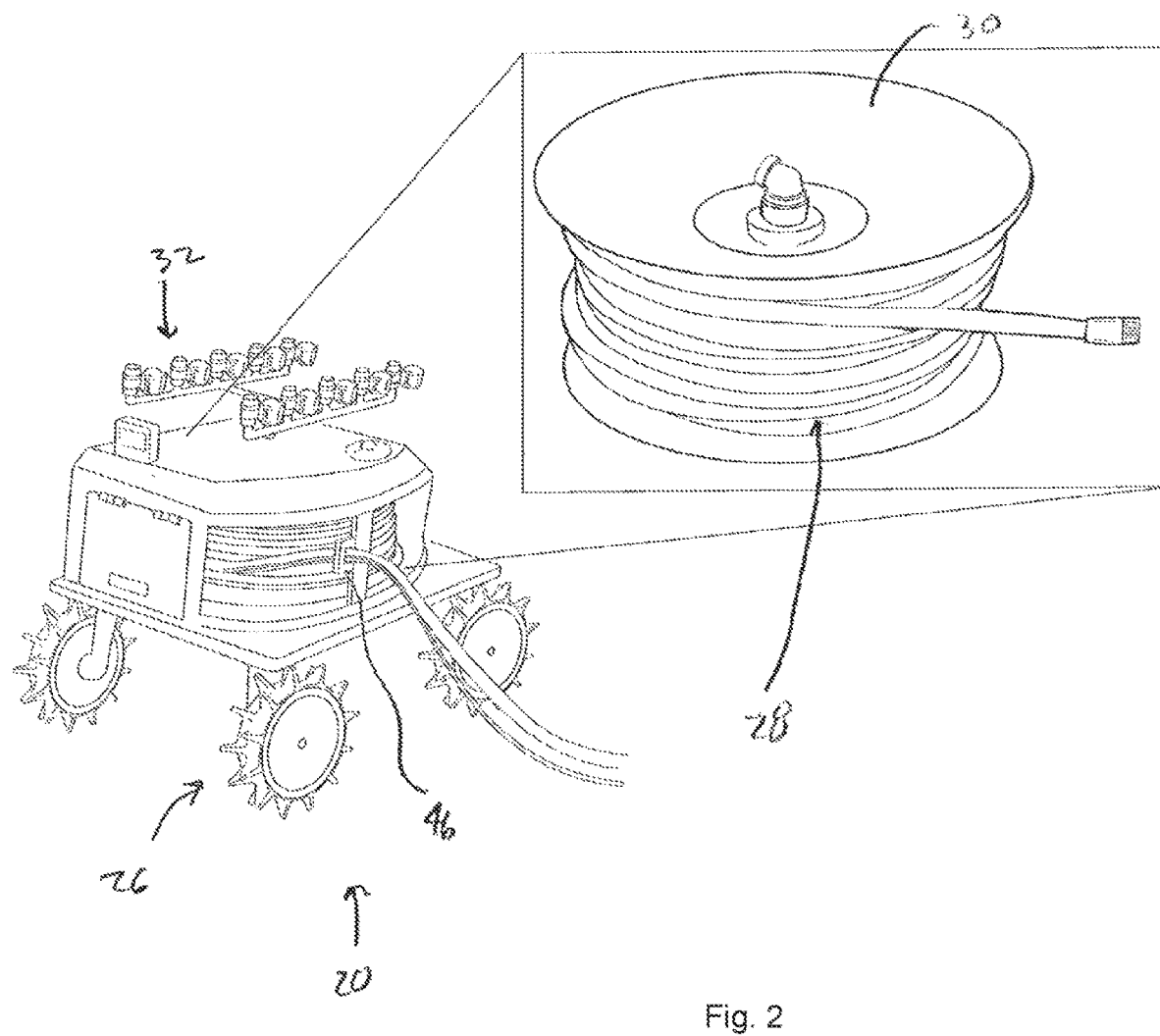
FIG. 2 shows a perspective view of an exemplary water delivery platform of the autonomous irrigation apparatus of the present disclosure and a hose pay-out from the water delivery platform of the autonomous irrigation apparatus of the present disclosure.
Figure 3:
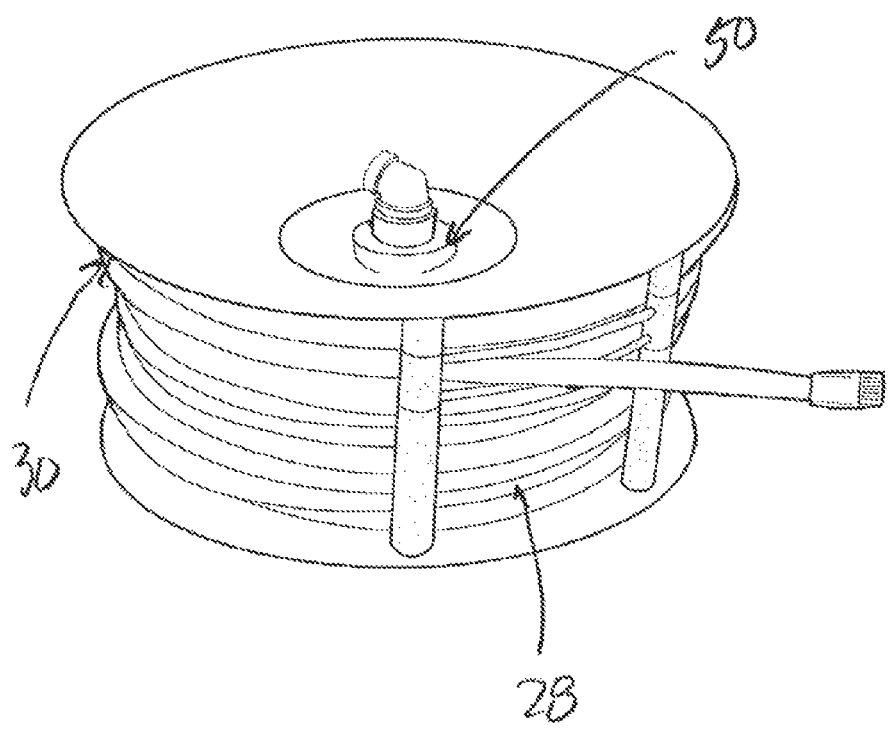
FIG. 3 shows a view of a hose pay-out from the water delivery platform of the autonomous irrigation apparatus of the present disclosure.
Figure 4:
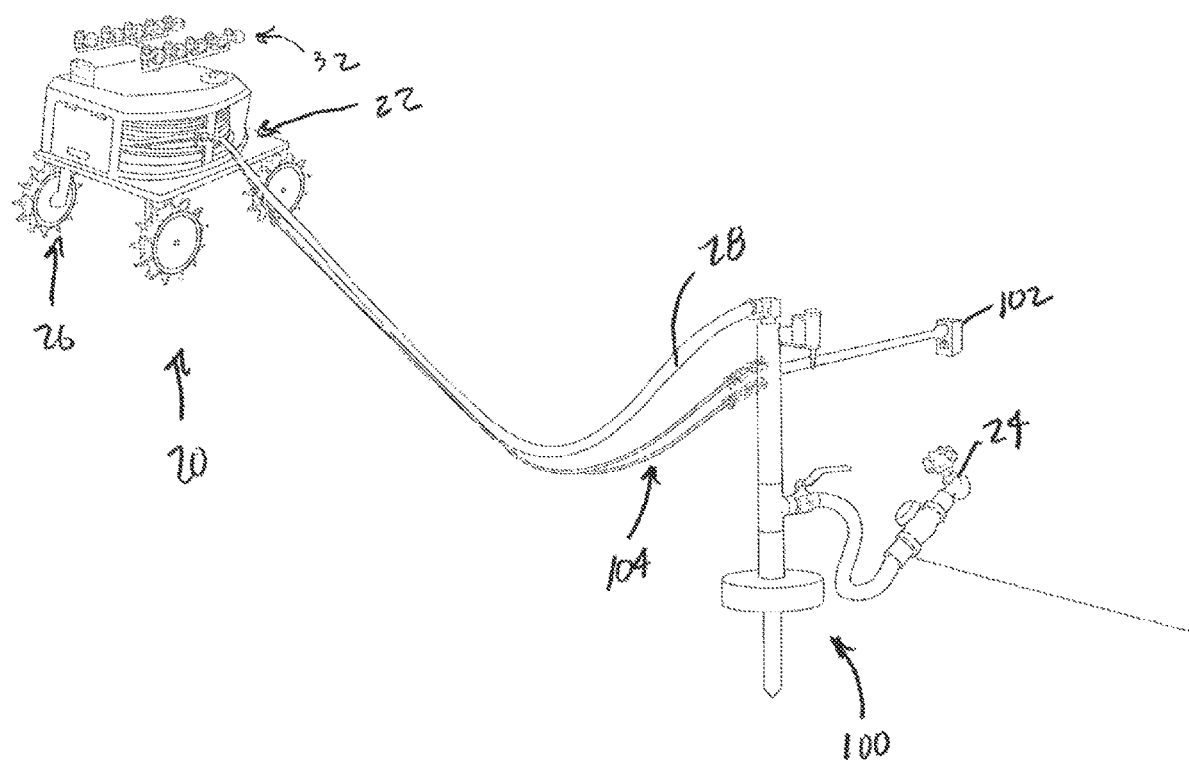
FIG. 4 shows a hose pay-out from the water delivery platform of the autonomous irrigation apparatus of the present disclosure.
Figure 5:
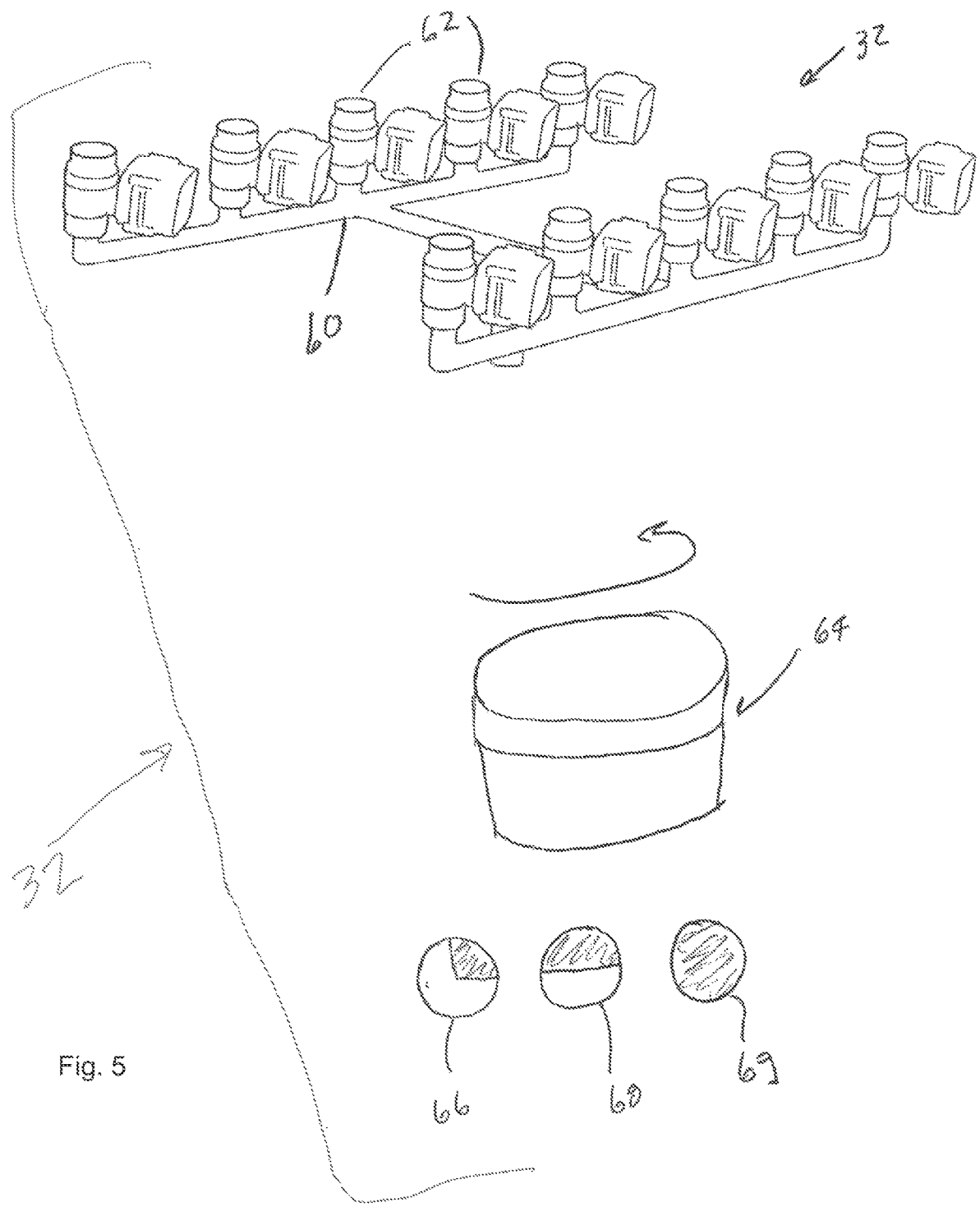
FIG. 5 shows a water dispensing sub-system for the autonomous irrigation apparatus of the present disclosure.
Figure 6:
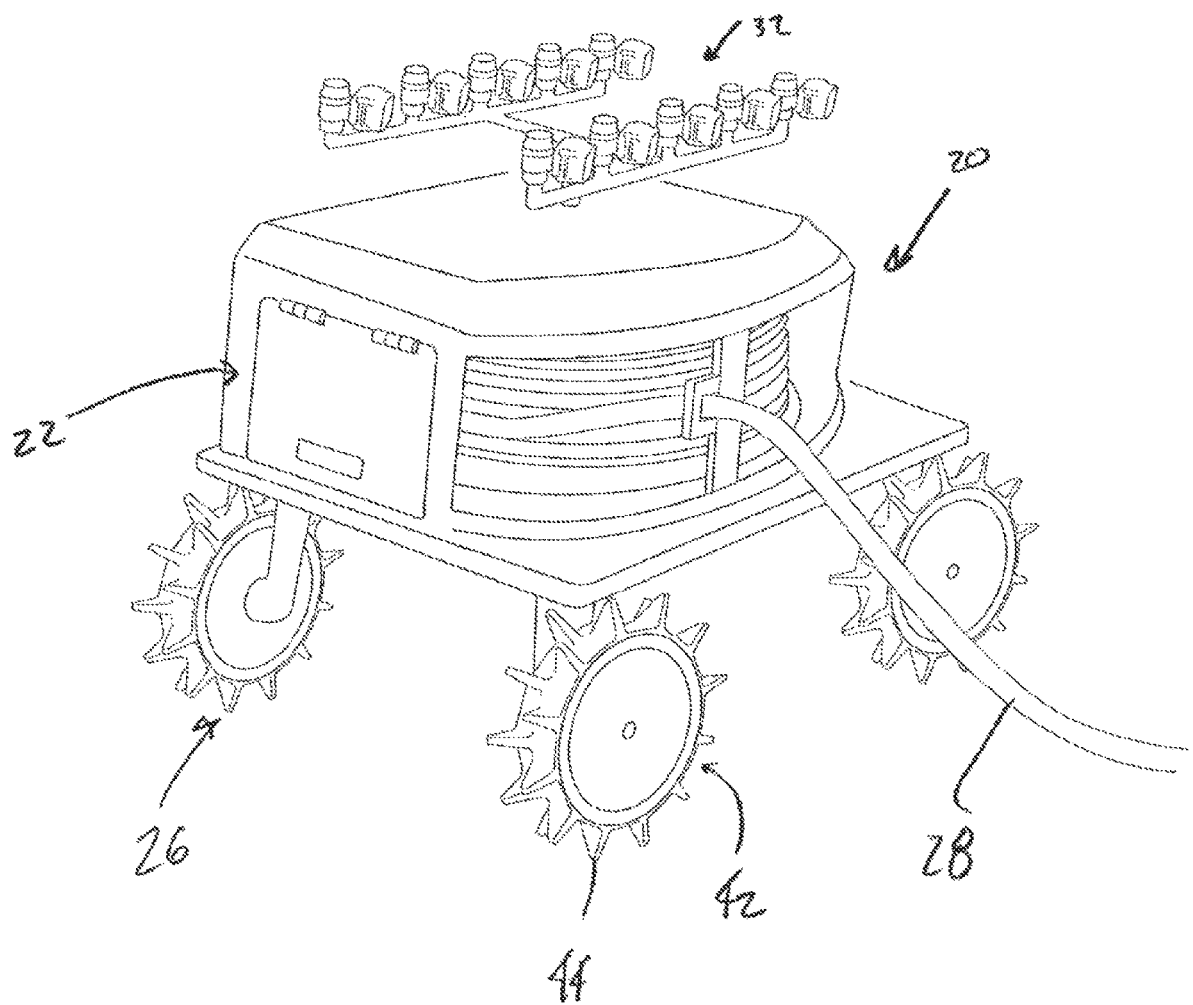
FIG. 6 shows a perspective view of an exemplary water delivery platform of the autonomous irrigation apparatus of the present disclosure.
Figure 7:
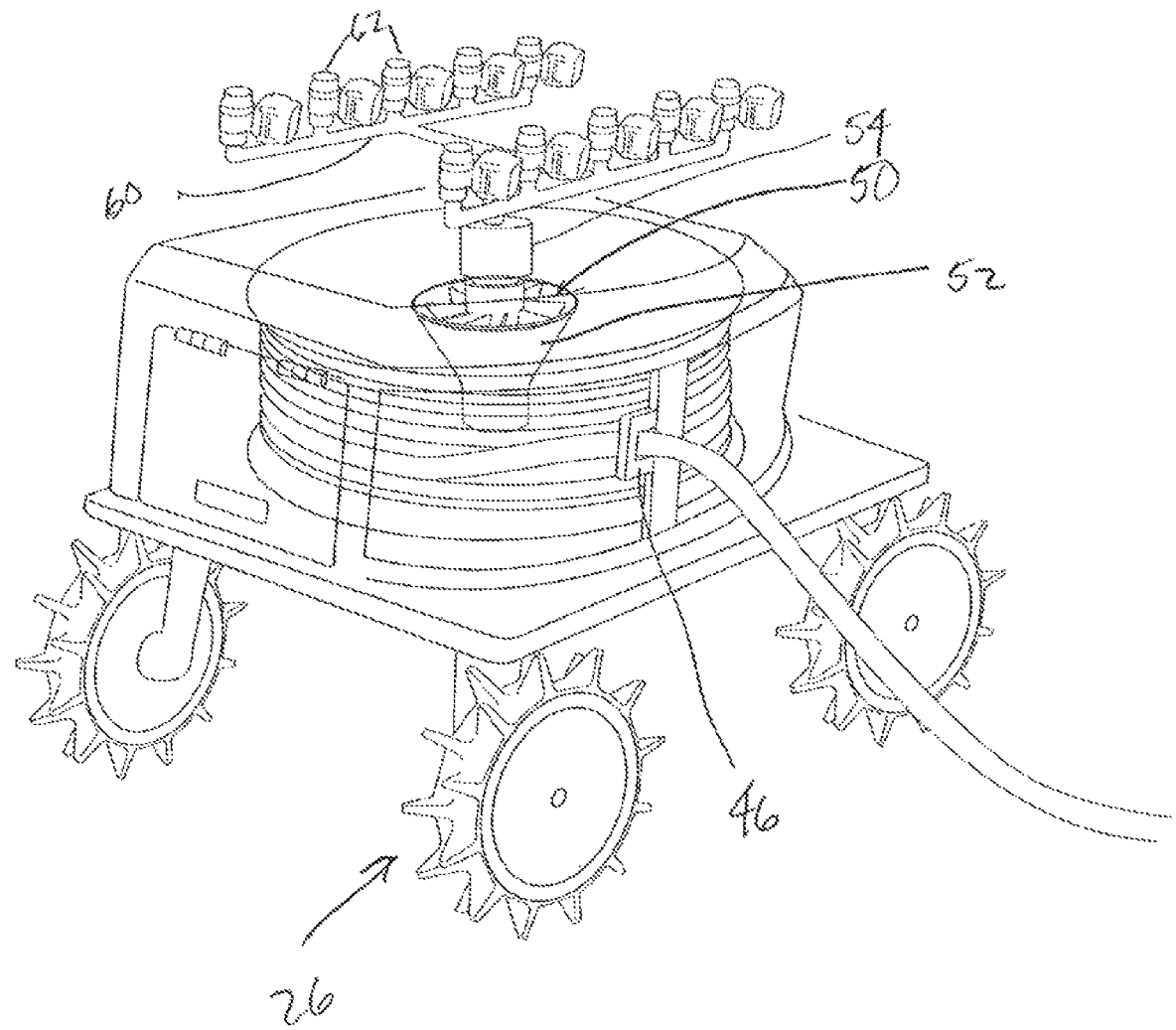
FIG. 7 shows the water delivery platform of FIG. 6 with a portion transparent to reveal additional features of the apparatus.
Figure 8:
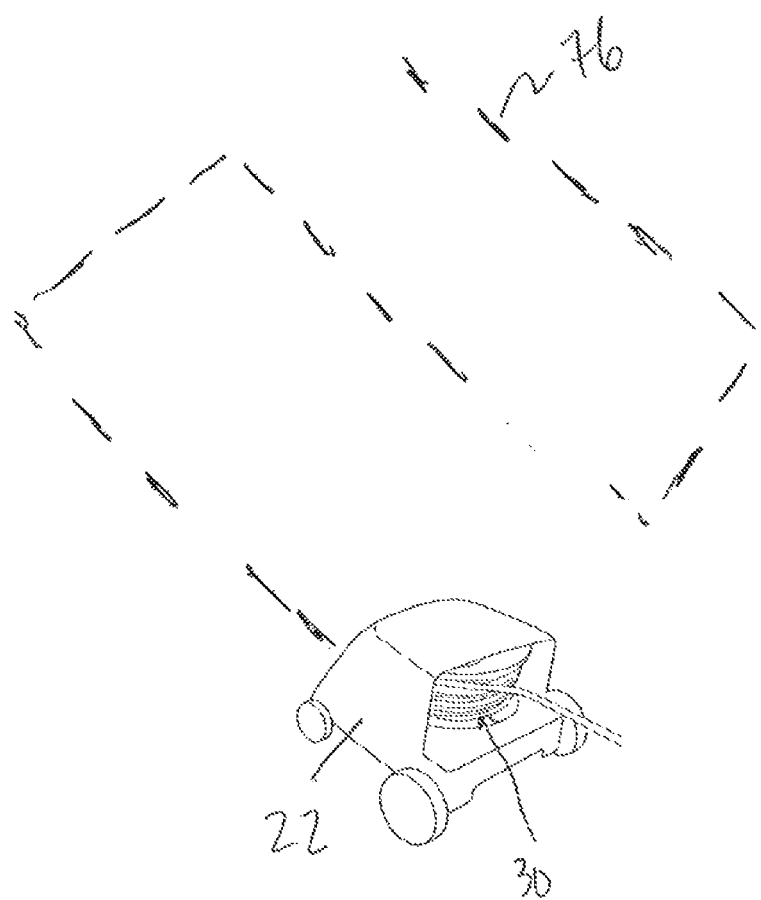
Figure 9:
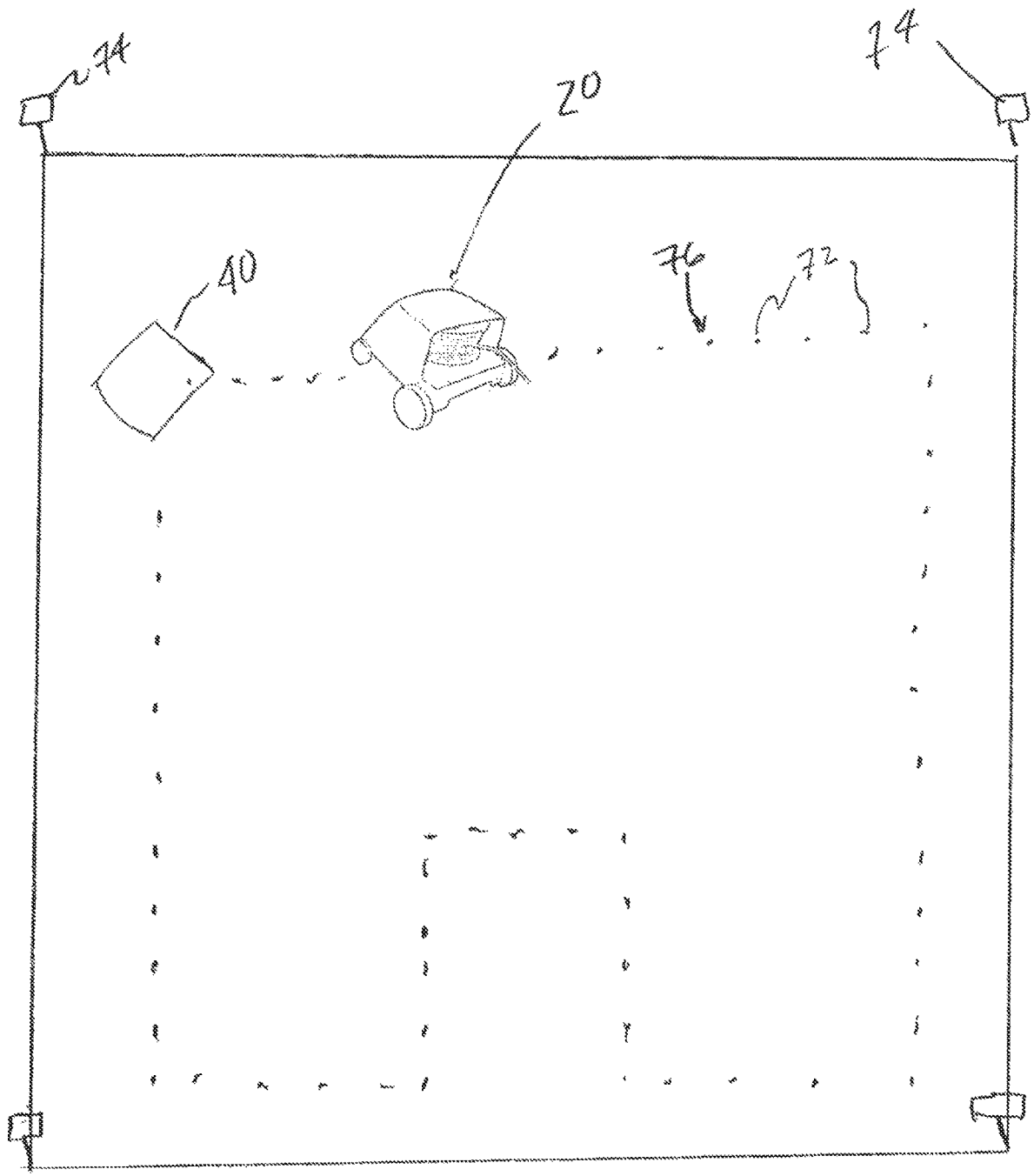
Figure 10:
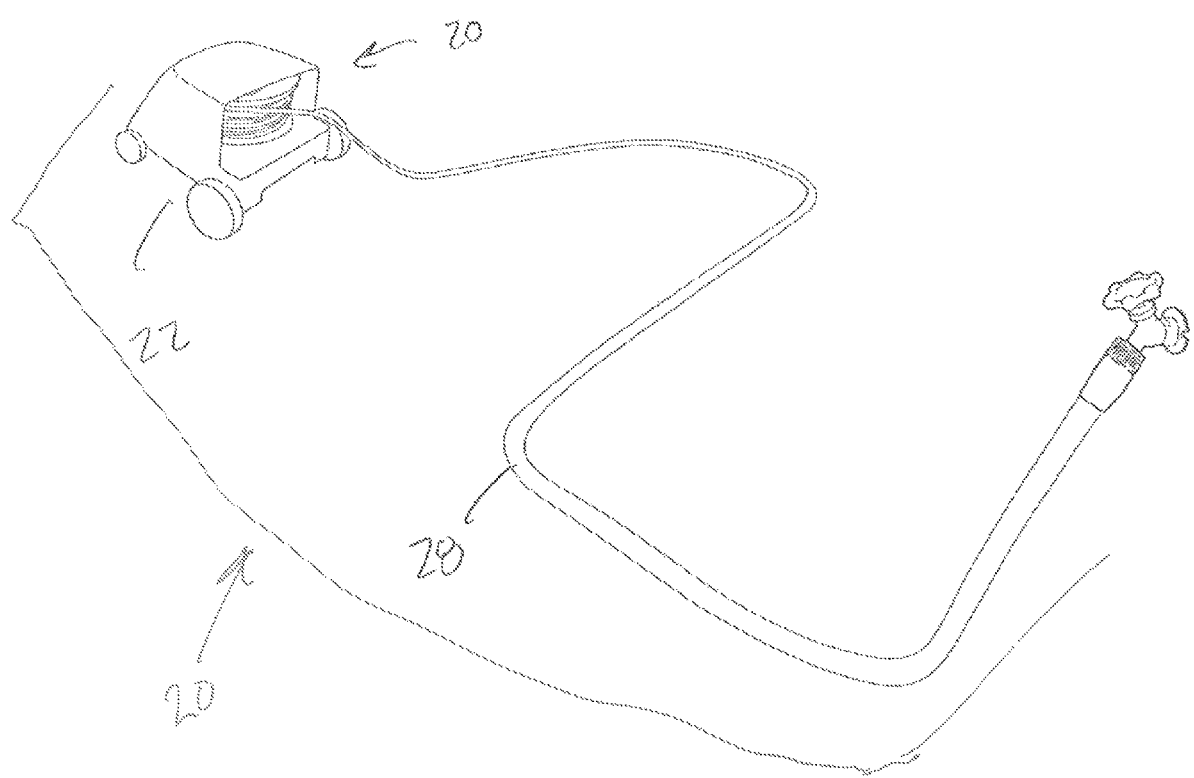
Figure 11:
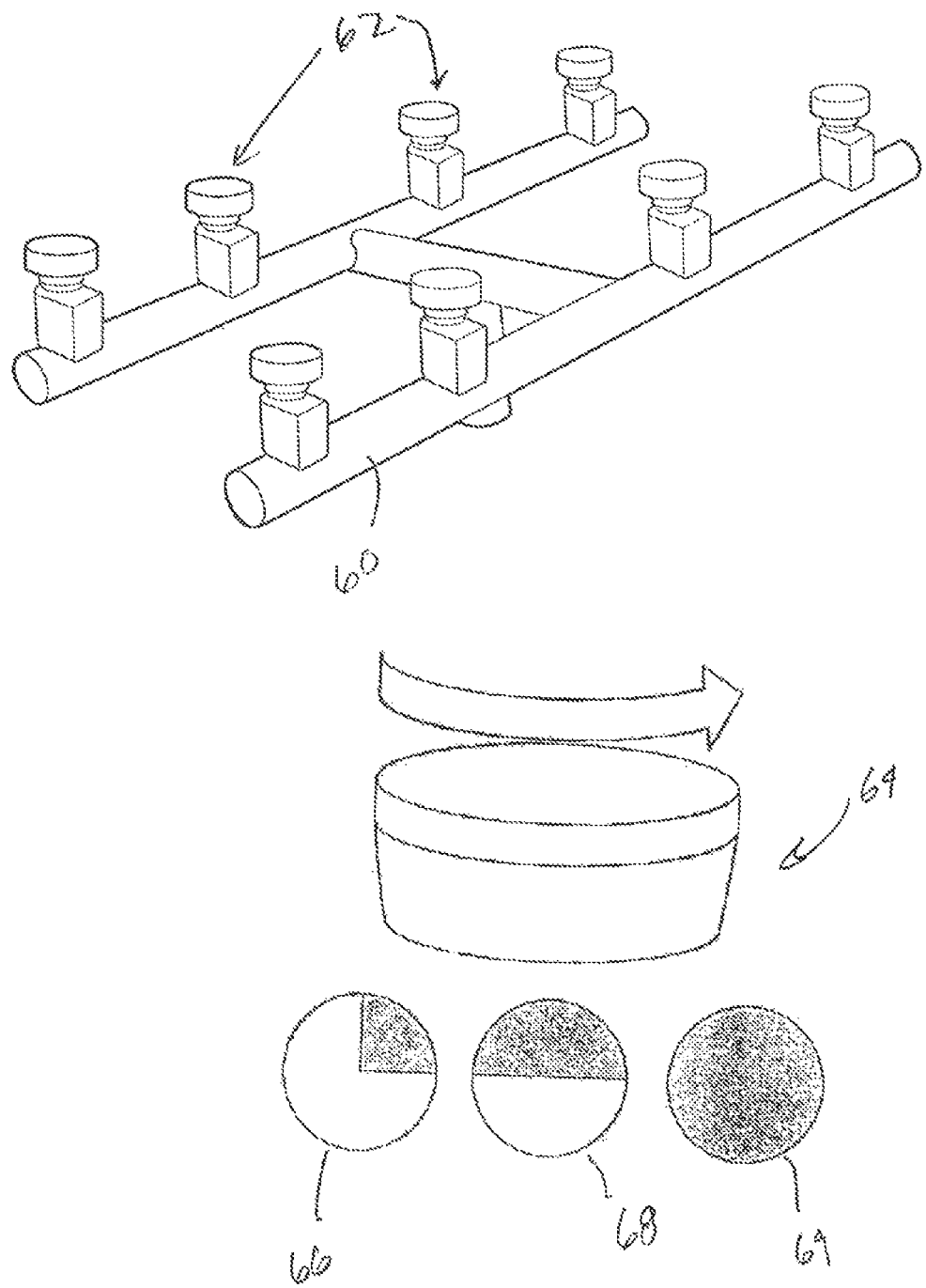
Figure 12:
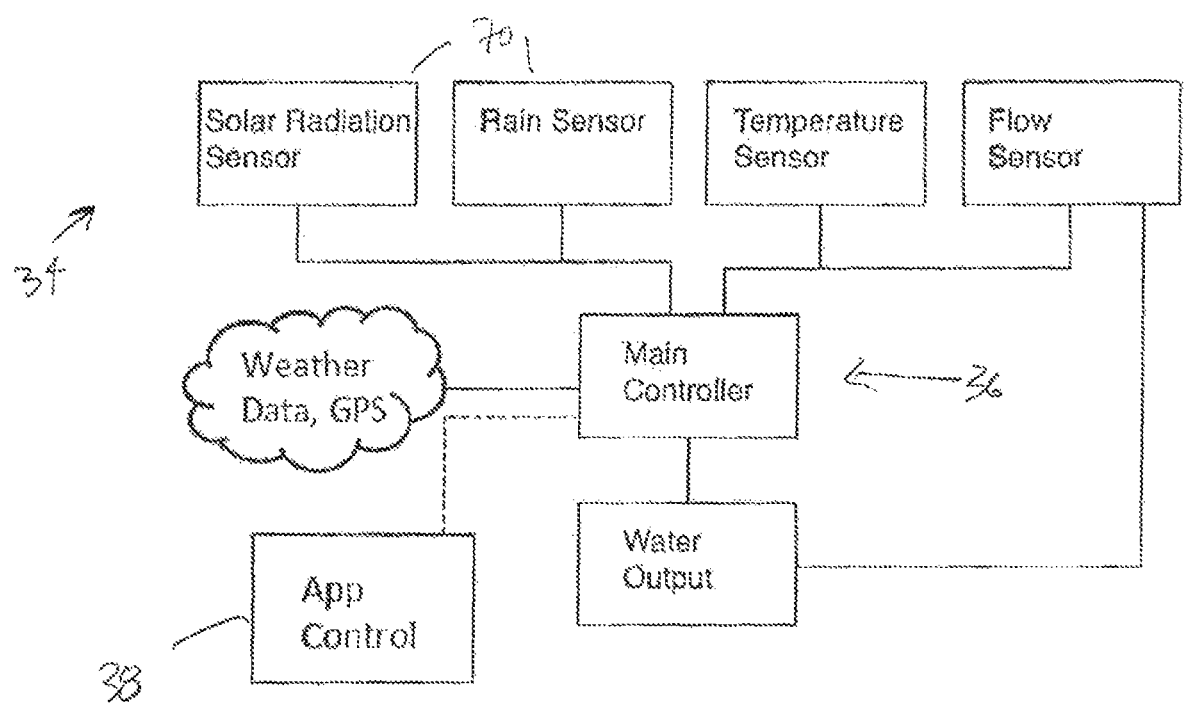
Figure 13:
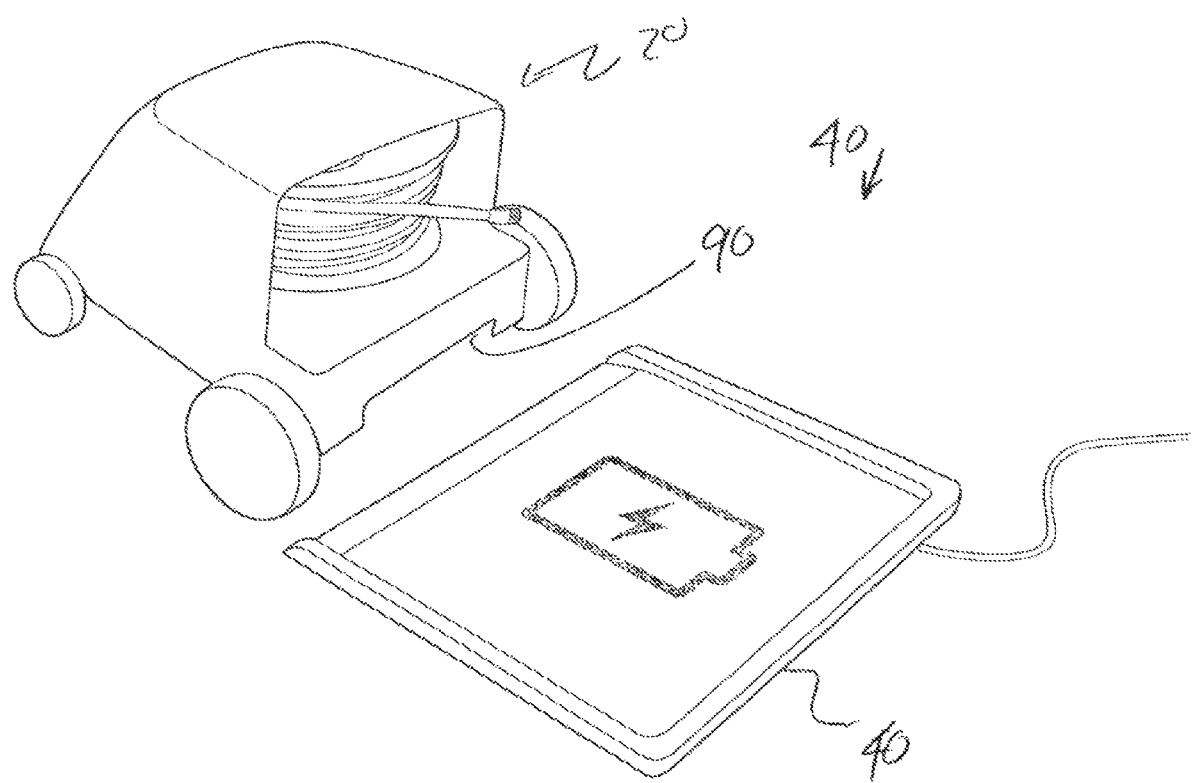
Figure 14:
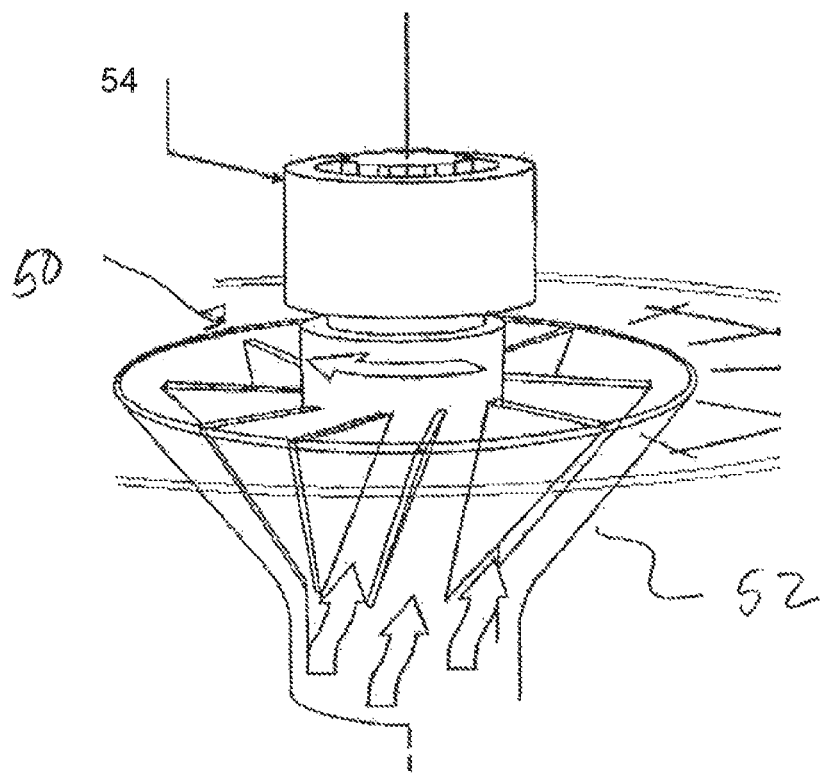

FIG. 8 highlights a water delivery path for the autonomous irrigation apparatus of the present disclosure;

FIG. 9 shows plan view of a water delivery path on a property to be irrigated according to the autonomous irrigation apparatus of the present disclosure;

FIG. 10 shows a hose pay-out from the water delivery platform of the autonomous irrigation apparatus of the present disclosure;

FIG. 11 shows a water dispensing sub-system for the autonomous irrigation apparatus of the present disclosure;

FIG. 12 schematically illustrates a sensor sub-system and a control sub-system for the autonomous irrigation apparatus of the present disclosure;

FIG. 13 depicts a power and charging sub-system for the autonomous irrigation apparatus of the present disclosure; and FIG. 14 shows the hose reel drive turbine for the autonomous irrigation apparatus of the present disclosure.

DETAILED DESCRIPTION

Example embodiments are provided so that this disclosure will be thorough, and will fully convey the scope to those who are skilled in the art. The specific details that are set forth such as in examples of specific components, devices, and methods, are intended to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. Example embodiments will now be described more fully with reference to the accompanying drawings.

The present disclosure is directed to an autonomous irrigation apparatus 20 that employs various data from the ambient environment to inform water dispensing functionality to optimize water use. The apparatus 20 can embody an above-ground, mobile, self-propelled, autonomous water delivery platform 22 (e.g., a water delivery robot) that is connected to a water source 24 from which it is able to draw a continuous supply of water for irrigating residential or commercial landscapes, lawns and/or gardens.

The irrigation apparatus 20 can generally include a water delivery platform 22, a drive sub-system 26, an onboard hose 28 and reel sub-system 30, a water dispenser sub-system 32, a sensor sub-system 34, a control sub-system 36, a user interface sub-system 38 and a power and charging sub-system 40.

Drive Sub-System

The drive sub-system 26 of the water delivery platform 22 can be of a multi-directional, all-wheel drive style allowing the each of the drive wheels 42 to move in any direction (e.g., forward, backward, pivot) based on the needs of the water delivery platform 22. Cast wheels 42 with aerating spikes 44 can perforate the soil with small holes allowing air, water and nutrients to penetrate to the roots of the grass in the lawn.

The drive sub-system can incorporate variable speeds to allow the water delivery platform 22 to gear-down and slow the speed or gear-up to increase speed based on the needs of the water delivery platform.

The drive sub-system 26 can be at least partially water-powered. In this respect, a portion of the water pressure from the water source 24 can be diverted to power the drive wheels 42. Alternatively or in addition, the drive sub-system 26 can be electrically-powered and incorporate one or more electric motors.

Hose and Reel Sub-System

The water delivery platform 22 can include a hose reel 30 and a hose 28 positioned on the platform 22 (e.g., in the center of the water delivery platform for stability). As one example, the hose reel 30 can be about 6" in height and have a diameter of about 18". The hose 28 can wrap around the hose reel 30. The hose 28 can be 150 feet in length and have a ⅜ inch inside diameter. The hose 28 can be made from a flexible, non-kinking material. The hose 28 can, for example, hold a water weight of approximately 7.5 lbs. when in operation.

The hose reel 30 can dispense (e.g., pay-out) and retract (e.g., take-up) the hose 28 as the water delivery platform 22 traverses the water delivery path. In this manner, the hose reel 30 can maintain appropriate slack in the hose 28, which remains connected to a water source 24, as the autonomous irrigation apparatus 20 carries out the irrigation process. The hose reel 30 prevents excess hose from creating an obstacle along the water delivery path and maximize the amount of the hose 28 inside the water delivery platform 22 under given conditions. The hose reel 30 can have a hose guide 46 through which the hose 28 can pass to assist the smooth and easy traverse of the hose 28 as it is dispensed/retracted from the hose reel 30. The hose reel 30 can also form an open structure 48 and the hose guide can allow the hose to be dispensed from at least three sides (e.g., the rear, left and right sides) of the water delivery platform 22 so that the water delivery platform can travel along the water delivery path without the hose 28 wrapping up on itself.

The hose reel 30 can incorporate a self-retracting, clutched rotatable spool 50. The spool 50 can be operated by a drive turbine 52 powered by water pressure from the water source. For example, the turbine 52 can include a valve that can open to enable water pressure to bypass the turbine 52 and allow the hose reel 30 to freely rotate as hose 28 is paid out. The valve can also be closed to force water pressure to drive the turbine and cause the reel to take up (e.g., reel-in) the hose 28.

Water Dispenser Sub-System

The water dispenser sub-system 32 can include a manifold 60 mounted on the top of the water delivery platform 22 and a plurality of spray nozzles 62 arranged on the manifold 60. The spray nozzles 62 can be adjustable to dispense water in any of a variety of patterns or distances, as needed or desired.

The spray nozzles 62 can be, for example, 8 ft quarter, 8 ft half and 8 ft full nozzles; 12 ft quarter, 12 ft half and 12 ft full nozzles as well as any others that may need to be used to provide proper water coverage. Spray nozzles 62 can be easily removed, replaced and/or reconfigured based on needs of any given application.

The spray nozzles 62 can be individually controlled by individual low voltage ball-style valves 64. Each ball valve can be separately activated (e.g., opened and closed) as the autonomous irrigation apparatus 20 carries out the irrigation process to optimize the water delivery in any given application.

As necessary, one or more inline pressure regulators can be included in the manifold 60 (e.g., between the hose reel drive turbine 52 and the manifold 60) to ensure correct or optimal water pressure (e.g., 30 psi) to the spray nozzles 62.

Sensing Sub-System

The water delivery platform 22 can be configured to automatically water a lawn only when needed. This will provide for water and money savings to a property owner. Based on sensed and predetermined conditions, the autonomous irrigation system 20 can operate according to a schedule that can be adjusted automatically based on environmental parameters and/or data, including information concerning local weather conditions (e.g., the presence of rain, ambient temperature, dew point, solar radiation level), the type of soil, and the property grade).

The autonomous irrigation system 20 can include a sensing sub-system that can include numerous sensors for collecting ambient environmental data. Some or all of the sensing sub-system can be located on the water delivery platform or, alternatively, some or all of the sensing sub-system can be incorporated with the control sub-system or the user interface sub-system.

The sensing sub-system 34 can include a plurality of sensors 70, such as a solar radiation sensor (e.g., to determine a level of direct sunlight or shade), a rain sensor, a soil sensor, a temperature sensor, a fluid flow sensor (e.g., to monitor water usage), a speed sensor, a GPS antenna/receiver, an infra-red sensor/reflector/transceiver, an ultrasonic sensor/reflector/transceiver, a radio frequency sensor/reflector/transceiver, and an RFID transponder/transceiver/antenna, for example.

Water Delivery Path and Navigation

Additionally, the sensor sub-system 34 can incorporate a plurality of locator pins 72 that can be positioned on the property to be irrigated. For example, the locator pins 72 can be about the size of a golf tee and can each have its own position identifier or address corresponding to its placement or location on the property and/or relative to the water delivery path. The locator pins 72 can be placed, for example, at boundary locations 74 (i.e., corners of the lawn) or along specific paths to enable the water delivery platform 22 to determine its location. The locator pins 72 can also be placed in designated areas where no watering is needed or desired. The locator pins 72 can be quickly and easily repositioned, removed and replaced. The locator pins 72 can allow the quick and easy setup of a water delivery path and can provide for flexibility as requirements change.

For example, the water delivery platform 22 can navigate a water delivery path using the locator pins 72 that can be staked at boundary positions 74 along a perimeter of an area to be irrigated. The locator pins 72 can be identified by positioning sensors which can be included in the sensing sub-system. For example, the water delivery platform 22 can be oriented to one corner of the lawn to be irrigated and travel in a straight line pattern near or at the edge of the lawn. At the corner the water delivery platform can using a 8 ft. quarter nozzle and then once 8 feet away from the boundary the nozzle can open to an 8 ft half nozzle. Once the water delivery platform 22 moves to the other side of the area, the water delivery path of the water delivery platform can overlap the initial spray pattern with a 12 ft. nozzle.

During this pattern the water delivery platform 22 can (with the use of the turbine) pay out and retract hose 28 at the appropriate places in the yard so that the apparatus 20 can reach each area of the yard without getting caught up on any obstacles. The water delivery platform 22 can ultimately return to the charging/docking station 40 to recharge after watering is complete.

Alternatively, or in addition to the locator pins 72, the sensor sub-system 34 can incorporate GPS navigation for creating an efficient water delivery path and enabling the water delivery platform 22 to dynamically determine its location, direction, speed and path during operation.

The sensor sub-system 34 can assist the autonomous irrigation apparatus 20 in determining a preferred and efficient use of energy and water during the irrigation process.

Control Sub-System

The autonomous irrigation apparatus 20 of the present disclosure can include a control sub-system 36 that plans, monitors, directs and executes functional control over the operation of the water delivery platform 22 (e.g., such as to when and how to irrigate a particular property). This control sub-system 36 can include a PLC, ASIC, computer, or smartphone operating control logic or application specific software. The control sub-system 36 can be internet compatible and communicate via WiFi, Bluetooth, or other wireless and/or wired communication protocols to monitor and direct operation of the autonomous irrigation apparatus 20 and water delivery platform 22. The control sub-system 36 can poll and collect data from the sensor sub-system 34, local weather service, determine positioning of locator pins 72 and provide additional programmable features to the property owner or manager. The control sub-system 36 can be employed to determine and carry-out start time(s), run time(s), run speed(s), weather data collection, sensor data collection, water usage monitoring, alerts and alarms, excess water flow monitoring, and water delivery paths.

The control sub-system 36 can aid in and/or determine the best and most efficient way to irrigate a property. For example, the control sub-system 36 can enable a time-based watering schedule or a controlled watering schedule. For example, the time-based feature can allow a user to determine start times, run times, pattern and direction of water delivery platform as desired A controlled watering schedule can be intelligent and learn and determine best watering practices. The controlled water schedule can use historical data and future weather forecasts, local weather service data, sensors, best proposed path, as well as any other programmed features. The controlled water schedule can employ a cycle and soak method that can allow the water to soak into the soil avoiding run-off. This method breaks up the watering into periods of watering followed by periods of pauses allowing for soaking to occur.

User Interface Sub-System

A user interface sub-system 38 can communicate with the control sub-system 36. The user interface sub-system 38 can be embodied in a smartphone App or computer software that can connect to the control sub-system 36 via a wired or wireless communication protocol, such as over a WiFi network, a wired or wireless LAN, or Bluetooth, for example. The user interface sub-system 38 can enable control of, and provide detailed information and events relating to, the autonomous irrigation system.

For example the user interface sub-system 38 can enable a user to control various options for the water delivery platform 22, either manually or automatically. The start times, run times, run speeds, run patterns and water usage can be accessed and displayed via the user interface sub-system. Additionally, reports can be generated and viewed by the user interface sub-system 38, such as historical, current and forecasted use reports. Historical reports can detail watering history and usage. Current reports can detail current water schedule. Forecast reports can detail expected water schedule based upon local weather stations. Water saving reports can detail how much water is saved based upon using water delivery platform control features.

Power and Charging Sub-System

The water delivery platform 22 incorporate a rechargeable battery a recharging/docking station 40. The rechargeable battery 90 can be recharged when it is docked at the recharging/docking station 40. A rechargeable deep-cycle battery 90 can provide necessary power for the water delivery platform 22 to water a lawn and allow for recharging between watering cycles.

The recharging/docking station can additionally include a water source connection/dock 100. For example, a pivoting water source connection pedestal can be provided at the docking station. The pivoting connection can, in turn, be connected to a main water supply. Thus, the pivoting water source connection 100 can enable the water delivery platform to move through its intended path without concerns of any kinking in the hose while providing a constant water supply.

Alternatively, the system can be powered from an AC outlet 102 on the building. Here, a cord or wires 104 would run with the hose 28. The cord or wires 104 would be paid in and out with the hose 28 on the reel 30. A housing hose may provide a conduit so both the irrigation hose 28 and cord or wire 104 are in a single hose. Further, the cord or wires 104 could be directly connected with the hose 28.

The foregoing describes an autonomous irrigation system including a self-propelled, water delivery platform that can enable intelligent lawn watering. The system features a hose 28 and reel 30 carried on the water delivery platform 22 that dispenses and retracts a hose 28 therefrom while traveling a water delivery path or pattern over the property to be irrigated. The water delivery platform 22 uses technology to determine the path and mechanically uses a turbine 52 with valve to control the placement of hose around obstacles which allow it to efficiently water the yard and come back to its origin with hose fully retained within the apparatus.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An autonomous irrigation apparatus that employs various data from an ambient environment to inform water dispensing functionality to optimize water use comprising:
    an above-ground, mobile, self-propelled, autonomous water delivery platform connected to a water source from which it is able to draw a continuous supply of water for property irrigation;
    a water dispenser system on the water delivery platform for dispensing water for the property irrigation, the water dispenser system including a hose and a hose reel assembly on the platform, the hose connected to the water source, wherein the hose reel assembly operates to dispense and retract sections of the hose at least based upon a distance of the autonomous water delivery platform from the water source; and
    a control system for controlling the autonomous water delivery platform and the water dispenser system.

2. The autonomous irrigation apparatus according to claim 1, further comprising a drive system for propelling the platform along the ground.

3. The autonomous irrigation apparatus according to claim 1, wherein a sensor system is coupled with the control system for sensing various parameters.

4. The autonomous irrigation apparatus according to claim 3, wherein the sensor system senses environmental parameters such as precipitation, solar radiation or temperature.

5. The autonomous irrigation apparatus according to claim 1, wherein a user interface is coupled with the control system for enabling manual control of the property irrigation.

6. The autonomous irrigation apparatus according to claim 1, further comprising a power and charging system including a docketing station coupling with a battery on the platform.

7. The autonomous irrigation apparatus according to claim 1, wherein a plurality of sensors are positioned on the ground to define a path and the platform following the path for distributing water.

8. The autonomous irrigation apparatus according to claim 1, wherein the water dispenser system includes an array of nozzles for distributing water responsive to ground characteristics and terrain.

9. The autonomous irrigation apparatus according to claim 1, wherein the control system synthesizes data from input of onboard and other sensors to provide a watering plan.

10. The autonomous irrigation apparatus according to claim 1, wherein a power cord runs with the hose.

11. The autonomous irrigation apparatus according to claim 1, wherein the autonomous water delivery platform is configured to move along a dynamic path and dispense and retract the sections of the hose only via at least one of a left side, a right side, and a rear of the autonomous water delivery platform, to prevent the hose from obstructing the autonomous water delivery platform as the autonomous water delivery platform moves along the dynamic path.

12. An irrigation system for determining watering needs for lawn and garden areas and distributing a varying amount of water for each area comprising:
    an above-ground, mobile, self-propelled, autonomous water delivery platform connected to a water source from which it is able to draw a continuous supply of water for property irrigation;
    a water dispenser sub-system on the water delivery platform for dispensing water for the property irrigation;
    a hose and a hose reel coupled with the water dispenser sub-system, wherein the hose reel includes a self-retracting rotatable spool that operates to dispense sections of the hose from the spool and retract the sections of the hose onto the spool to maintain engagement of the hose with the water source;
    a control system for controlling the autonomous water delivery platform and the water dispenser sub-system; and
    the platform controlled by a programmable path.

13. The irrigation system according to claim 12, wherein a sensor system is coupled with the control system for sensing various environmental parameters such as precipitation, solar radiation or temperature.

14. The irrigation system according to claim 12, wherein a plurality of sensors are positioned on the ground to define a path and the platform following the path for distributing water.

15. The irrigation system according to claim 12, wherein the water dispenser sub-system includes an array of nozzles for distributing water responsive to ground characteristics and terrain.

16. The irrigation system according to claim 12, wherein the control system synthesizes data from input of onboard and other sensors to provide a watering plan.

17. The irrigation system according to claim 12, further comprising a power and charging system including a docketing station coupling with a battery on the platform.

18. The irrigation system according to claim 12, wherein a user interface is coupled with the control system for enabling manual control of the property irrigation.

19. The irrigation system according to claim 12, further comprising a drive system for propelling the platform along the ground.

20. An autonomous irrigation apparatus that employs various data from an ambient environment to inform water dispensing functionality to optimize water use comprising:

an above-ground, mobile, self-propelled, autonomous water delivery platform connected to a water source from which it is able to draw a continuous supply of water for irrigating;

a water dispenser system on the water delivery platform for dispensing water for the property irrigation, the water dispenser system including a hose and a hose reel assembly on the platform, the hose connected to a water supply, wherein the hose reel assembly operates to dispense and retract sections of the hose at least based upon a distance of the autonomous water delivery platform from the water source;

a control system for controlling the autonomous water delivery platform and the water dispenser system; and a hose guide through which the sections of the hose extend and retract relative to a spool from at least one of a right side, a left side and a rear of the autonomous water delivery platform.

* * * * *